United States Patent [19]

Morrison

[11] Patent Number: 4,570,786
[45] Date of Patent: Feb. 18, 1986

[54] CONVEYOR PULLEY

[75] Inventor: Thomas E. Morrison, Guin, Ala.

[73] Assignee: The B. F. Goodrich Company, Akron, Ohio

[21] Appl. No.: 562,631

[22] Filed: Dec. 19, 1983

Related U.S. Application Data

[63] Continuation-in-part of Ser. No. 437,379, Oct. 28, 1982, abandoned.

[51] Int. Cl.⁴ ............................................. B65G 39/10
[52] U.S. Cl. .................................................... 198/842
[58] Field of Search ................ 198/842, 835; 474/166, 474/162

[56] References Cited

U.S. PATENT DOCUMENTS 2,736,205  2/1956  Dunne, Jr. .......................... 198/842
2,763,158  9/1956  Firth .................................... 198/842
2,767,590  10/1956  Currier ................................ 198/842

Primary Examiner—Joseph E. Valenza
Assistant Examiner—Kyle E. Shane
Attorney, Agent, or Firm—Joseph Januszkiewicz

[57] ABSTRACT

A conveyor pulley that is mounted on a shaft having a bushing keyed thereto. The bushing has a flange that is bolted to a pair of discs and a plate member. The bushing is tapered to provide a wedging fit with the discs and the plate. One of the discs is disposed between the remaining disc with its outer peripheral edge welded to the pulley's rim. The respective discs and plate are welded together at a substantial distance from the shaft.

6 Claims, 3 Drawing Figures

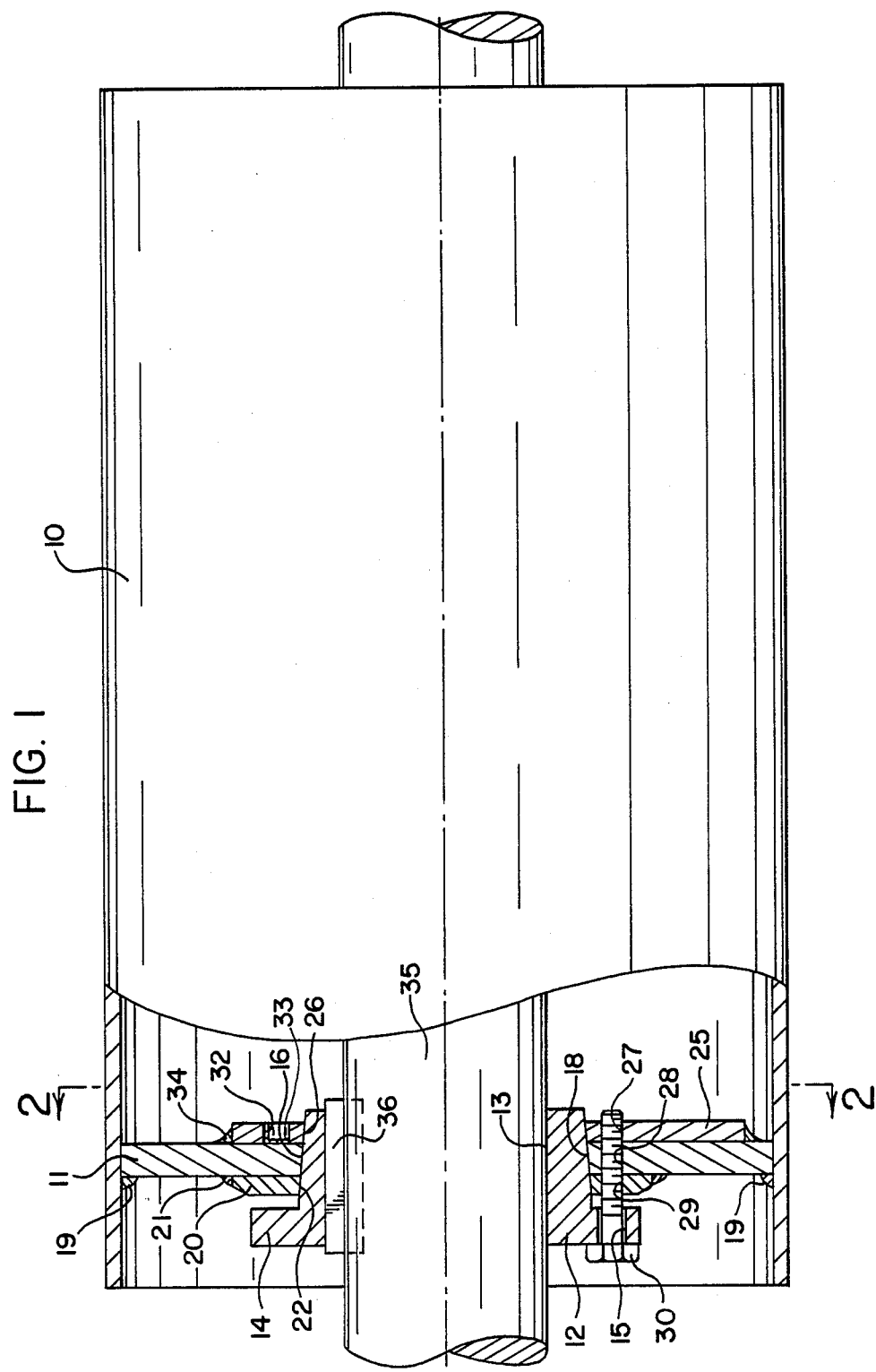

CONVEYOR PULLEY

This application is a continuation-in-part application of application Ser. No. 437,379 filed Oct. 28, 1982, now abandoned.

BACKGROUND OF THE INVENTION

This invention relates to conveyor pulleys and more particularly to a new and improved hubless pulley with end discs.

In the manufacture of conveyor pulleys considerable time and effort is required to fabricate the hub which interconnects the bushing and the disc which in turn is connected to the cylindrical rim. The machining time ordinarily required to interfit the tapered bushing with the tapered hub is considerable and correspondingly expensive. In connecting the web or disc to the hub and rim, distortion appears due to the the welding necessary to interconnect these parts. In order to improve the heat affected welding zone, the conveyor pulley of the instant invention is fabricated without a hub. In addition a plurality of discs are mechanically interconnected to the bushing of the pulley and thence welded to the rim or to each other to improving fatigue life. This permits the reducing of the ratio of the weld size to the principle disc thickness. Only the principle disc is connected to the cylindrical rim.

SUMMARY OF THE INVENTION

The present invention contemplates a conveyor pulley that includes a pair of spaced bushings that can be attached to a shaft. Each bushing has a flanged portion with a tapered cylindrical portion on which are mounted at least a pair of disc and a plate member. The discs and plate member are bolted to the flanged portion and also attached to each other by peripheral welds. The principle disc which is annular is connected to the cylindrical rim of the pulley by fillet welds.

BRIEF DESCRIPTION OF THE DRAWINGS

FIG. 1 is a front elevational view of a conveyor pulley, partly in section to illustrate the bushings and disc structure.

DETAILED DESCRIPTION

Figure 3:
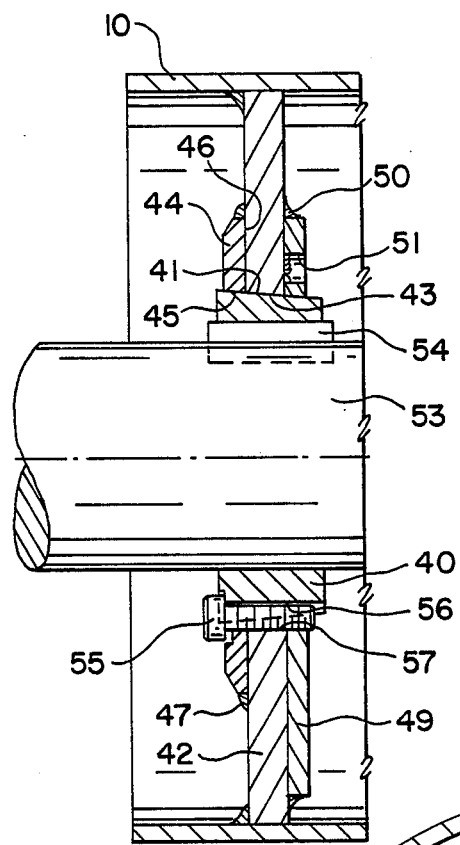
FIG. 3 is a cross-sectional view of a modified form of a conveyor pulley.

Referring to the drawings, wherein like reference numerals designate like or corresponding parts throughout the several views, there is shown in FIG. 1 a longitudinally disposed cylindrical rim 10. The respective end portions of the rim 10 are supported by support means which includes a pair of laterally spaced annular discs 11 to be described.

Within the rim 10 is a pair of laterally spaced bushings 12 (only one shown) with a central bore 13 extending longitudinally therethrough. Since both bushings are alike only one will be described. The bushing 12 has an annular flange 14 with a plurality of circumferentially spaced holes 15 along the outer portion thereof. The bushing's outer surface 16 tapers from flange 14 inwardly and downwardly toward the longitudinal center line of bore 13.

Figure 2:
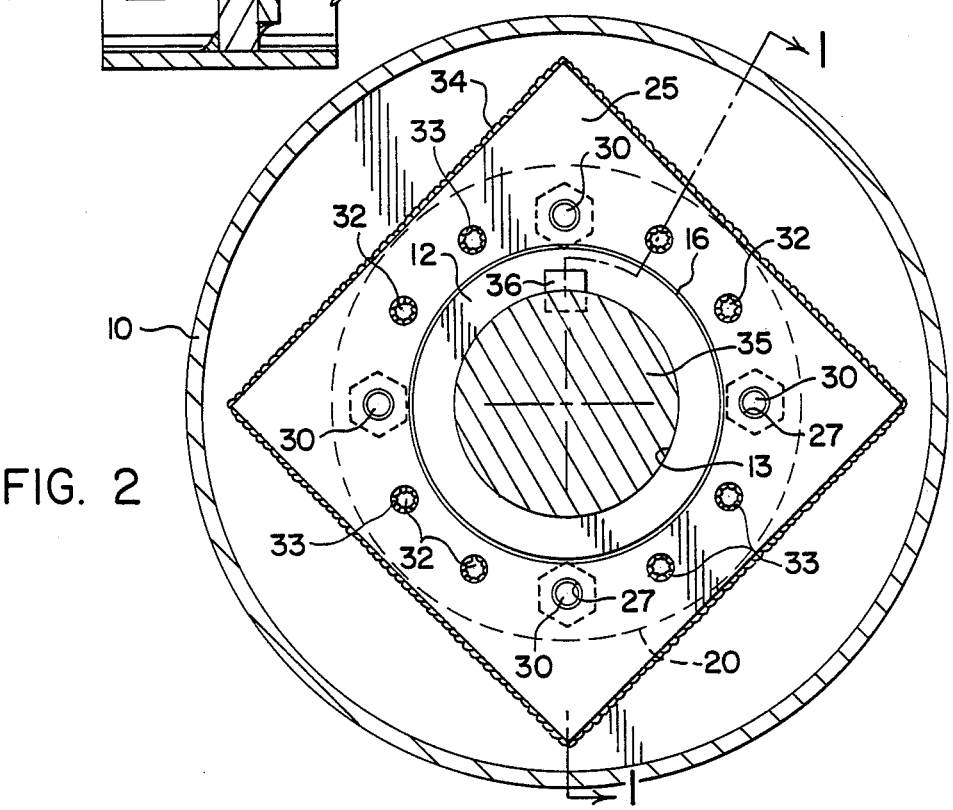
FIG. 2 is an end elevational view of the conveyor pulley.

The support means which includes the annular discs 11 interconnects the bushing 12 to the cylindrical rim 10. Disc 11 has a central bore 18 that tapers substantially at the same angle as the outer surface 16 of bushing 12 such as to abuttingly receive the bushing 12. The outer peripheral side edge of disc 11 is welded to the inner surface of rim 10 as by fillet welds as at 19. An annular disc 20 located between the flange 14 and disc 11 abuttingly engages disc 11 and is welded thereto as at 21 along its outer circumferential edge. The central bore 22 of disc 20 tapers at the same angle as the outer surface 16 of bushing 12 to frictional engage the bushings' 12 outer surface 16. Also mounted on tapering surface 16 is a square shaped plate 25 as shown in FIG. 2 having a central bore 26 and a plurality of circumferential spaced bores 27 aligned with circumferential spaced bores 28, 29 and 15 in disc 11, disc 20 and flange 14 respectively. All of the bores 27, 28 and 29 are threaded to receive bolts 30. Square shaped plate 25 which may be polygonal has a plurality of circumferential spaced bores 32 permitting the welding of plate 25 to disc 11 which weld is a plug weld 33. Plate 25 is also welded to the disc 11, indicated as 34. In lieu of a square shaped plate 25 such plate may be of circular configuration in which case such member is referred to as a disc. As used herein disc refers to a flat annular member while plate refers to a flat member with linear sides.

The bushings 12 receive a shaft 35 and is secured for rotation therewith as by a key 36.

In the assembling of the conveyor pulley, plate 25 is plug welded to the disc 11 along the various circumferential spaced bores 32 and then the annular disc 20 and the square shaped plate 25 are welded along their outer periphery to annular disc 11 as at 21 and 34 respectively. The tapered bores 22, 18 and 26 are then machined or suitably finished to their tapered size on the joined discs 20, 11 and plate 25 respectively, assuring a proper fit with the tapered surface 32 on bushing 12. The plurality of circumferentially spaced holes 29, 28 and 27 in discs 20, 11 and plate 25 are then drilled and tapped thereby assuring their alignment with bore 15 in bushing 12. The welding of the annular discs 20 and 11 and plate 25 is done at a distance as great as possible from the longitudinal center line of the tapered bores 22, 18 and 26 to eliminate heat distortion. Pairs of bushings 12 and the support means that include annular discs 11 and 20 and plate members 25 are then assembled as units onto shaft 35 and may be keyed thereto as at 36. The cylindrical rim 10 is then slid over the spaced pair of annular discs 11 and fillet welded thereto as at 19.

A variation on the construction of such described conveyor pulley is to eliminate the need for the annular flange 14 on bushing 12 and its corresponding circumferentially spaced holes 15. In addition, the holes 29, 28 and 27 can be eliminated. The rim 10 is supported by a pair of spaced bushings 40 (only one shown). The bushings outer surface 41 tapers downwardly, such that the taper of each bushing tapers toward each other. A disc 42 with a central tapered bore 43 is frictionally received by the tapered outer surface 41. A smaller diameter disc 44, also with a centrally disposed tapered bore 45, is frictionally received by the tapered outer surface 41 and has it one flat annular surface 46 abuttingly contacting disc 42. Disc 44 is welded to the disc 42 along the outer peripheral surface as at 47. Also mounted on the tapered outer surface 41 of bushing 40 in abutting contact with the annular disc 42 is a square shaped plate 49. Plate 49 has its outermost edge welded as at 50 to disc 42. Square shaped plate 49 may be polygonal or of circular configuration. Plate 49 has a plurality of circumferential shaped bores 51 permitting the plug welding of plate 49 to disc 42. The annular disc 42 is welded to the rim 10 along its outer peripheral edge as a fillet weld. Bushing 40 receive shaft 53 and is secured for rotation therewith as by a key 54.

The bushing 40 is connected to the annular discs 42 and 44 and the plate 49 by a plurality of circumferentially spaced wedging screws 55, shown as cap screws, parallel with the axis of rotation of the shaft 53. These screws 55 are secured in holes therof provided by drilling and tapping holes 56 at the juncture of the bushings 40 and the plate 49 along with discs 44 and 42. Such holes 56 may be counterbored to receive the heads of screw 55. The counter-bore may be of less depth in bushing 40 than in the disc 44 to provide a shoulder for the screw 55 to bear against. The hole 56 after drilling is provided with threads as at 57 only in the discs and plate 49. The bushing portion of the hole 56 is without threads. (See U.S. Pat. No. 2,856,211 and U.S. Pat. No. 2,763,158). Thus the screws 55 on tightening pull the tapered bushing 40 into the matching taper of the discs and plate providing a wedging and locking action. The modified form of the embodiment is assembled in substantially the same manner as described in the first embodiment wherein the welding is done first, then the bores are drilled followed by the tapping of holes 56.

Various modifications are contemplated and may be resorted to by those skilled in the art without departing from the described invention, as hereinafter defined by the appended claims, as only preferred embodiments thereof has been disclosed.

I claim:

1. A conveyor pulley comprising a cylindrical rim, a pair of spaced bushings within said rim, each of said bushings having a central bore, a shaft received by each of said central bores and keyed to said bushings for rotation therewith, said bushings having spaced outer surfaces that taper toward each other, a first annular disc with a central tapered bore received by each of said tapered outer surfaces of said bushings, a second annular disc with a central tapered bore received by each of said tapered outer surface of said bushings, each of said first annular discs being welded to adjacent ones of said second discs along the outer peripheral edge of each of said first discs, each of said second discs welded to said rim along the juncture of the outer peripheral edge of each of said second discs adjacent said rim, a plate member with a central tapered bore received by each of said tapered outer surfaces of said bushings and having its outer edge welded to adjacent ones of said second discs, and means interconnecting each of said bushings with said plates and said discs mounted thereon.

2. A conveyor pulley as set forth in claim 1 wherein each of said plate members is polygonal in shape.

3. A conveyor pulley as set forth in claim 2 wherein each of said plate members and adjacent ones of said second discs are interconnected by plug welds.

4. A conveyor pulley as set forth in claim 3 wherein said spaced bushings are interconnected to said plates and said discs mounted thereon by screws, said interconnection by said screws between said bushings, plates and discs include a plurality of circumferentially spaced holes, each of said spaced holes have portions in said bushings and the remaining portions of each said holes are in said discs and plates, and wherein only those portions of said holes in said discs and plates are threaded for said screws.

5. A conveyor pulley as set forth in claim 1 wherein each of said plate members is a circular disc.

6. A conveyor pulley as set forth in claim 5 wherein each of said circular discs and adjacent ones of said second discs are interconnected by plug welds.

* * * * *